US010861180B2

(12) United States Patent
Bailey

(10) Patent No.: US 10,861,180 B2
(45) Date of Patent: Dec. 8, 2020

(54) MEASUREMENTS USING A SINGLE IMAGE CAPTURE DEVICE

(71) Applicant: OHIO STATE INNOVATION FOUNDATION, Columbus, OH (US)

(72) Inventor: Melissa Diane Bailey, Gahanna, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 110 days.

(21) Appl. No.: 16/083,745

(22) PCT Filed: Mar. 10, 2017

(86) PCT No.: PCT/US2017/021764
§ 371 (c)(1),
(2) Date: Sep. 10, 2018

(87) PCT Pub. No.: WO2017/156383
PCT Pub. Date: Sep. 14, 2017

(65) Prior Publication Data
US 2019/0096078 A1 Mar. 28, 2019

Related U.S. Application Data

(60) Provisional application No. 62/306,394, filed on Mar. 10, 2016.

(51) Int. Cl.
G06K 9/00 (2006.01)
G06T 7/62 (2017.01)
G01B 11/02 (2006.01)
G01B 11/08 (2006.01)
G06F 21/32 (2013.01)
G01B 11/22 (2006.01)
G06T 7/50 (2017.01)
G06T 7/246 (2017.01)

(52) U.S. Cl.
CPC ............... G06T 7/62 (2017.01); G01B 11/02 (2013.01); G01B 11/08 (2013.01); G01B 11/22 (2013.01); G06F 21/32 (2013.01); G06K 9/0061 (2013.01); G06T 7/248 (2017.01); G06T 7/50 (2017.01)

(58) Field of Classification Search
CPC .. G06T 7/62; G06T 7/248; G06T 7/50; G06K 9/0061; G01B 11/22; G01B 11/08; G01B 11/02; G06F 21/32
See application file for complete search history.

(56) References Cited

U.S. PATENT DOCUMENTS

| 2002/0093515 | A1 | 7/2002 | Fay et al. | |
|---|---|---|---|---|
| 2006/0098867 | A1* | 5/2006 | Gallagher | G06K 9/0061 382/167 |
| 2011/0176708 | A1 | 7/2011 | Silveira et al. | |
| 2013/0170754 | A1* | 7/2013 | Tsukizawa | G06K 9/00604 382/195 |

(Continued)

OTHER PUBLICATIONS

U.S. Patent and Trademark Office. International Written Opinion and Searching Authority. Application No. PCT/US2017/021764. dated Jun. 6, 2017. 12 pages.

*Primary Examiner* — Xin Jia
(74) *Attorney, Agent, or Firm* — Meunier Carlin & Curfman LLC

(57) ABSTRACT

Disclosed herein are methods and apparatus for making measurements using a single image capture device.

18 Claims, 7 Drawing Sheets

(56) References Cited

U.S. PATENT DOCUMENTS

| | | | |
|---|---|---|---|
| 2014/0226876 A1 | 8/2014 | Savvides et al. | |
| 2015/0245767 A1* | 9/2015 | Northcott | A61B 3/1216 351/206 |
| 2015/0323310 A1* | 11/2015 | Coon | G06K 9/0061 348/135 |
| 2016/0239702 A1* | 8/2016 | Makino | G06K 9/0061 |

* cited by examiner

US 10,861,180 B2

MEASUREMENTS USING A SINGLE IMAGE CAPTURE DEVICE

CROSS-REFERENCE TO RELATED APPLICATION

This application is a national stage application filed under 35 U.S.C. § 371 of PCT/US2017/021764 filed Mar. 10, 2017, which claims priority to and benefit of U.S. Provisional Patent Application No. 62/306,394 filed Mar. 10, 2016, which is fully incorporated by reference and made a part hereof.

BACKGROUND

Currently, the best ways to determine the distance between an image capture device and an object is to place the object a defined distance from the image capture device or to use triangulation with lasers or two cameras, etc. Substitutes for triangulation with lasers or two cameras also exist. For example, several "online" measurements of the eye use techniques of a known size of an object in an image. One example includes an app/webpage that uses a credit card in an image to detect how far the person is from the camera, how many pixels there are in a millimeter (mm), and then output the distance between the eyes so that the person can use that measurement to order glasses online.

However, none of the known techniques allow simple detection of distance that would only require a single image capture device such as a camera without the use of an object of a known size in the image. As such, such a method or device that utilizes only a single image capture device is desired in that it would be less expensive in terms of hardware.

SUMMARY

Described herein are devices and methods to find the distance between an object and an image capture device in circumstances when only one image capture device's view of the scene is available and laser triangulation is also not available.

Methods and devices are also described herein for determining a size or shape of any object in an image, a distance between any two objects or points in the image, or a rate of movement (speed) of the two objects or points in the image based upon the determined ratio of pixels per unit of measure.

Other systems, methods, apparatus, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Figure 1:
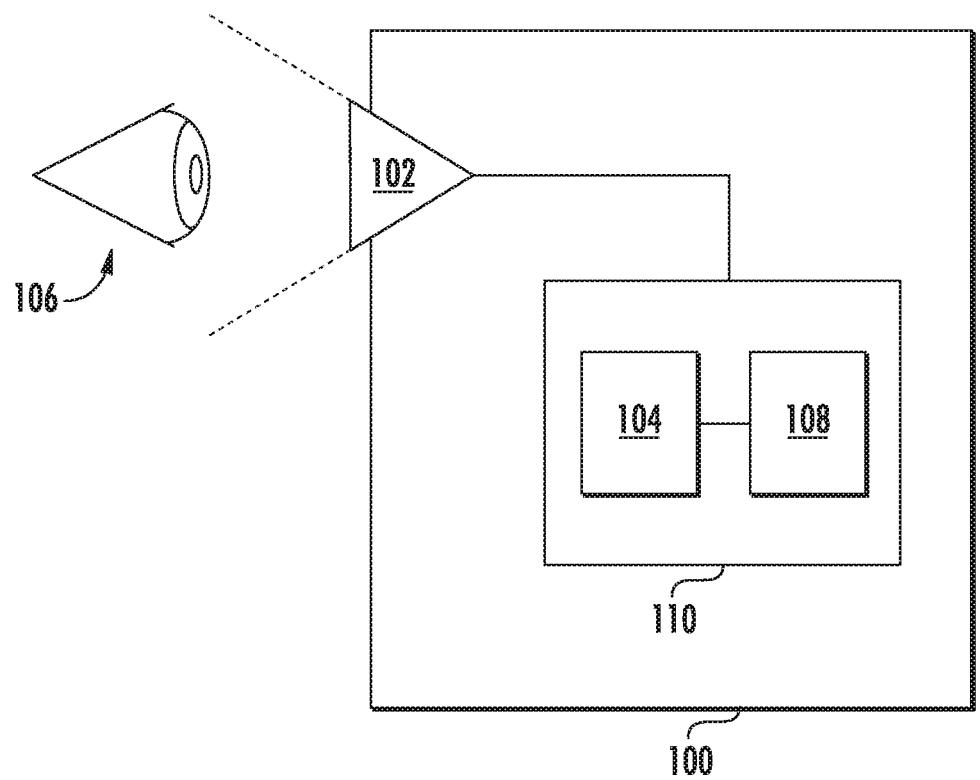
FIG. 1 illustrates an exemplary overview apparatus for making distance measurements using a single image capture device.

The present methods and systems may be understood more readily by reference to the following detailed descrip- FIG. 1 illustrates an exemplary overview apparatus making distance measurements using a single image capture device. As shown in FIG. 1, one embodiment of the apparatus 100 comprises an image capture mechanism 102. In one aspect, the image capture mechanism 102 can be a camera. The image capture mechanism 102 can take still and/or video images. Generally, the image capture mechanism 102 will be a digital camera, but can be an analog device equipped with or in communication with an appropriate analog/digital converter. The image capture mechanism 102 may also be a webcam, scanner, recorder, or any other device capable of capturing a still image or a video.

In one aspect, the image capture mechanism 102 is in direct communication with a computing device 110 through, for example, a network (wired (including fiber optic), wireless or a combination of wired and wireless) or a direct-connect cable (e.g., using a universal serial bus (USB) connection, IEEE 1394 "Firewire" connections, and the like). In other aspects, the image capture mechanism 102 can be located remotely from the computing device 110, but capable of capturing an image and storing it on a memory device such that the image can be downloaded or transferred to the computing device 110 using, for example, a portable memory device and the like. In one aspect, the computing device 110 and the image capture mechanism 102 can comprise or be a part of a device such as a smart device, smart phone, table, laptop computer or any other mobile computing device.

In a basic configuration, the computing device 110 can be comprised of a processor 104 and a memory 108. The processor 104 can execute computer-readable instructions that are stored in the memory 108. Moreover, images captured by the image capture device 102, whether still images or video, can be stored in the memory 108 and processed by the processor 104 using computer-readable instructions stored in the memory 108.

The processor 104 is in communication with the image capture device 102 and the memory 108. The processor 104 can execute computer-readable instructions stored on the memory 108 to capture, using the image capture device 102, an image. In one aspect, the captured image can include an eye 106 of a subject.

The processor 104 can further execute computer-readable instructions stored on the memory 108 to capture, using the image capture device 102, a first image comprising an eye 106, wherein the first image of the eye 106 comprises an iris of the eye. The processor can determine a number of pixels in the first image that span a diameter of the iris of the eye. The number of pixels that span the diameter of the iris of the eye can be an estimated iris diameter to determine a ratio of pixels per unit of measure (for example, pixels per millimeter (mm)) for the first image. The estimated iris diameter can comprise an average iris diameter of a human or an animal with a known horizontal visible iris diameter (HZVID). In images of an eye, human or animal, there is already something of a "known size," the HZVID. It is the distance from one edge of the visible iris to the other edge at the widest portion of the iris. In almost all adult humans, this ranges from 10.5 to 13.5 mm. If a mean of 11.5 mm is assumed, then the distance between the eye and the image capture device can be estimated fairly precisely. In other aspects, the HZVID can be measured and input the measurement value into the software. This is also true for other species. HZVID is fairly consistent across individuals within a population. The precision of the measurement can be further improved by knowing the age of the child or animal. For example, in a human child, an assumed HZVID of 10.5 mm may yield better results.

In one aspect, the estimated iris diameter comprises an average iris diameter of a human based upon an age of the human. For example, the estimated iris diameter can comprise an average iris diameter of an adult human, which can be assumed to be about 11.5 mm. The processor can determine, based upon the determined ratio of pixels per unit of measure for the first image, a size or shape of any object in the captured first image or a first distance between any two objects or points in the captured first image.

Figure 2:
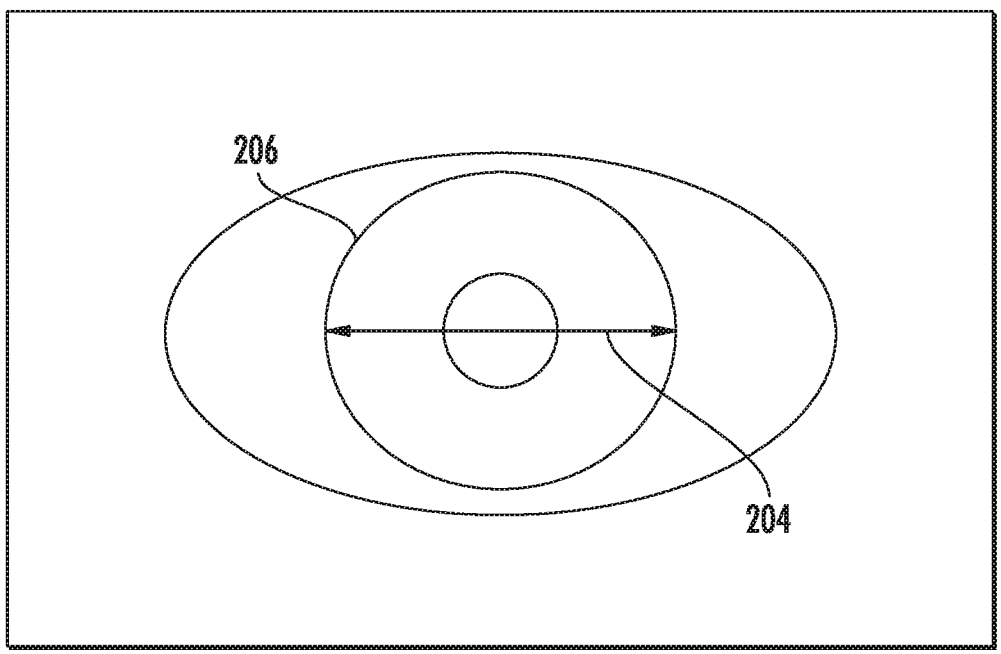
FIG. 2 is an example illustration of an application for the disclosed embodiments for determining a size of object in image or distance between objects in image or distance of movement of an object in two related images.

FIG. 2 is an example illustration of an application for the disclosed embodiments for determining a size of an object in an image or distance between objects in an image or distance of movement of an object in two related images. As shown in FIG. 2, an image of an eye 202 is captured. A bold line 204 is shown that spans a diameter of the iris 206 of the captured image of the eye 202. The length of the line 204, and thus the diameter of the iris 206 is assumed to be an assigned value (e.g., HZVID value). For example, the diameter of the iris 206 may be assumed to be approximately 11.5 mm. The camera or device that obtained the image can be used to determine the number of pixels along the line 204. For example, the number of pixels along the line 204 may be determined to be 115 pixels. Therefore, the ratio of pixels per unit of measure for the image in FIG. 2 can be determined by dividing the 115 pixels by 11.5 mm, which equals 10 pixels per millimeter. Knowing this, the size, shape, distance of any other objects in the image can be calculated from this measurement.

In another aspect, the processor executing computer-readable instructions stored in the memory further cause the processor to record a first time value when the first image is captured; capture a second image using the image capture device that includes the any two objects or points in the captured first image that were used to determine the first distance and recording a second time value when the second image is captured; determine, based upon the determined ratio of pixels per unit of measure for the first image, a second distance between the any two objects or points in the captured second image; and determine a speed of movement of at least one of the any two objects or points by dividing a change in the first distance and the second distance by a change in the first time value and the second time value. Alternatively, the processor executing computer-readable instructions stored in the memory further cause the processor to: record a first time value when the first image is captured; capture, using the image capture device, a second image comprising the eye, wherein the second image of the eye comprises the iris of the eye and the any two objects or points in the captured first image; determine a number of pixels in the second image that span a diameter of the iris of the eye; divide the determined number of pixels that span the diameter of the iris of the eye in the second image by the estimated iris diameter to determine a ratio of pixels per unit of measure for the second image; determine, based upon the determined ratio of pixels per unit of measure for the second image, a second distance between the any two objects or points in the captured first image; and determine a speed of movement of at least one of the any two objects or points by dividing a change in the first distance and the second distance by a change in the first time value and the second time value.

Further, acceleration and deceleration of the objects can be determined by measuring the rate of change of speed over a plurality of related images.

Figure 3A:
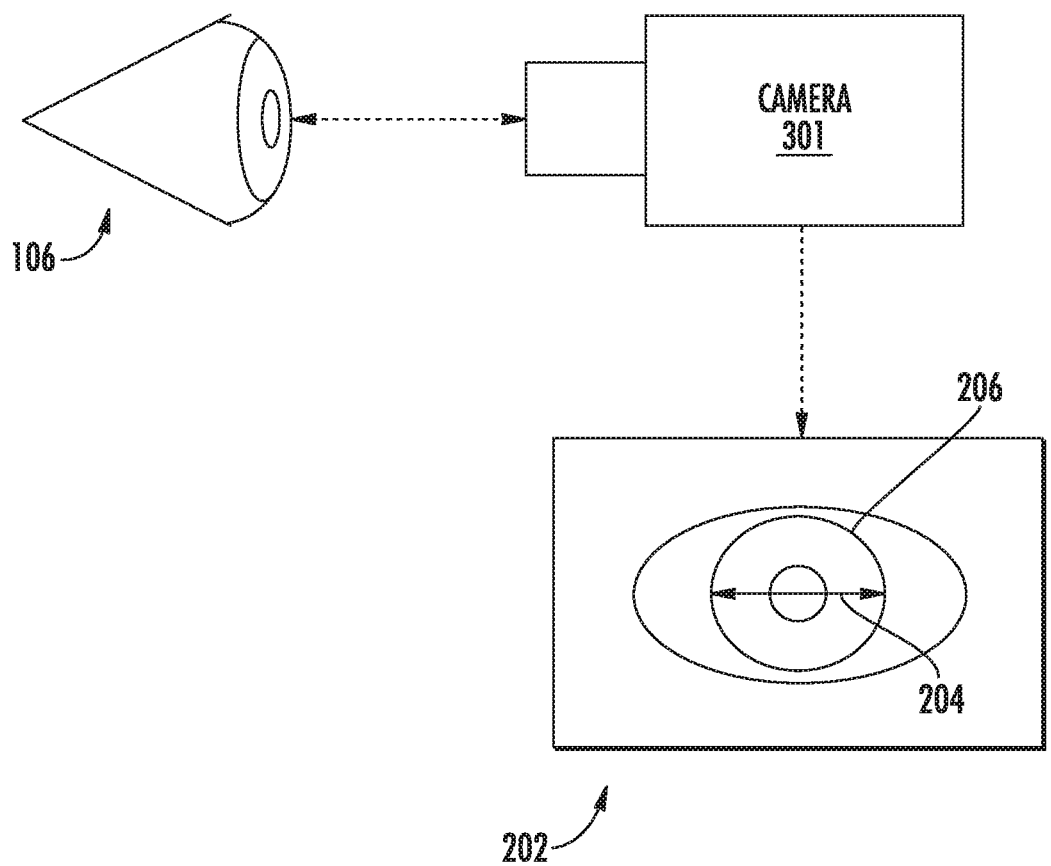
FIG. 3A is another example illustration of an application for the disclosed embodiments for determining a distance from an object in an image to an image capture device that captured the image.

FIG. 3A is another example illustration of an application for the disclosed embodiments for determining a distance from an object in an image to an image capture device that captured the image. As shown in FIG. 3A, an image 202 of an eye 106 of an animal having a known HZVID is captured by an image capture device (e.g., camera) 301. A bold line 204 is shown that spans a diameter of the iris 206 of the captured image of the eye. The length of the line, and thus the diameter of the iris is assumed in this case to be approximately 11.5 mm (e.g., the HZVID for an average adult human eye). The number of pixels along this line is determined to be 230 pixels. Therefore, the ratio of pixels per unit of measure for the image in FIG. 3A is determined by dividing the 230 pixels by 11.5 mm, which equals 20 pixels per millimeter in this image. Based on a table (FIG. 3B) that correlates a determined ratio of pixels per unit of measure for the image capture device to a distance the image capture device is from an object in an image captured by the image capture device, this measurement (i.e., the 20 pixels/mm) can be used to determine the distance that the image capture device is from the eye.

Figure 3B:
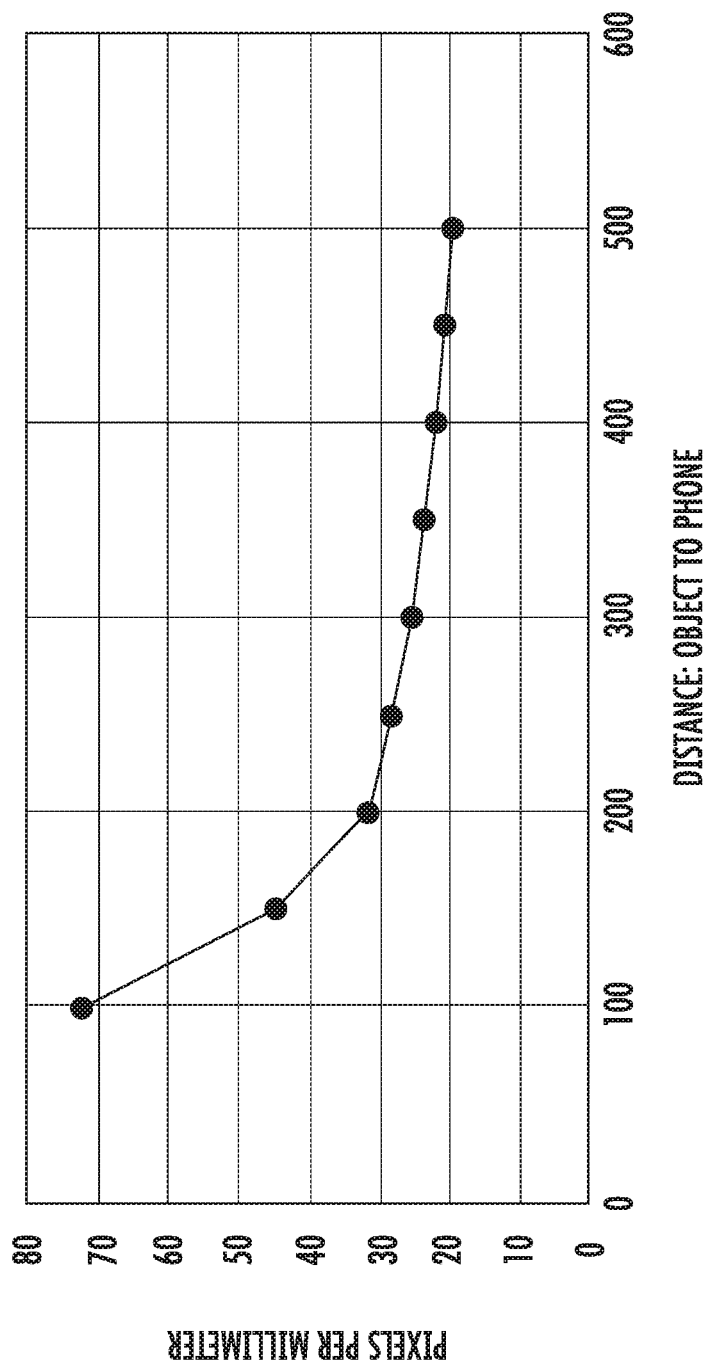
FIG. 3B is an exemplary table that correlates a determined ratio of pixels per unit of measure for the image capture device to a distance the image capture device is from an object in an image captured by the image capture device which can be used to determine the distance that the image capture device is from the eye.

The table is determined for a given manufactured camera by taking images of a ruler (or by knowing camera manufacturing specifications) and determining how many pixels are in a unit of measure (e.g., millimeter, inch, etc.) when an object is a certain distance from the image capture device. The graph in FIG. 3B is only example data from one camera. As the image capture device is moved further from the object, the estimate of the distance between the image capture device and the object may become less precise.

Generally, in one aspect, a processor in communication with the memory and the image capture device executes computer-readable instructions stored in the memory that cause the processor to capture, using the image capture device, a first image comprising an eye, wherein the first image of the eye comprises an iris of the eye; determine a number of pixels in the first image that span a diameter of the iris of the eye; divide the determined number of pixels that span the diameter of the iris of the eye by an estimated iris diameter to determine a ratio of pixels per unit of measure for the first image; using the determined ratio of pixels per unit of measure in the first image to determine a first distance that the image capture device was from an object in the first image using the table that correlates the determined ratio of pixels per unit of measure for the image capture device to the distance the image capture device is from the object in the image captured by the image capture device.

Figure 4:
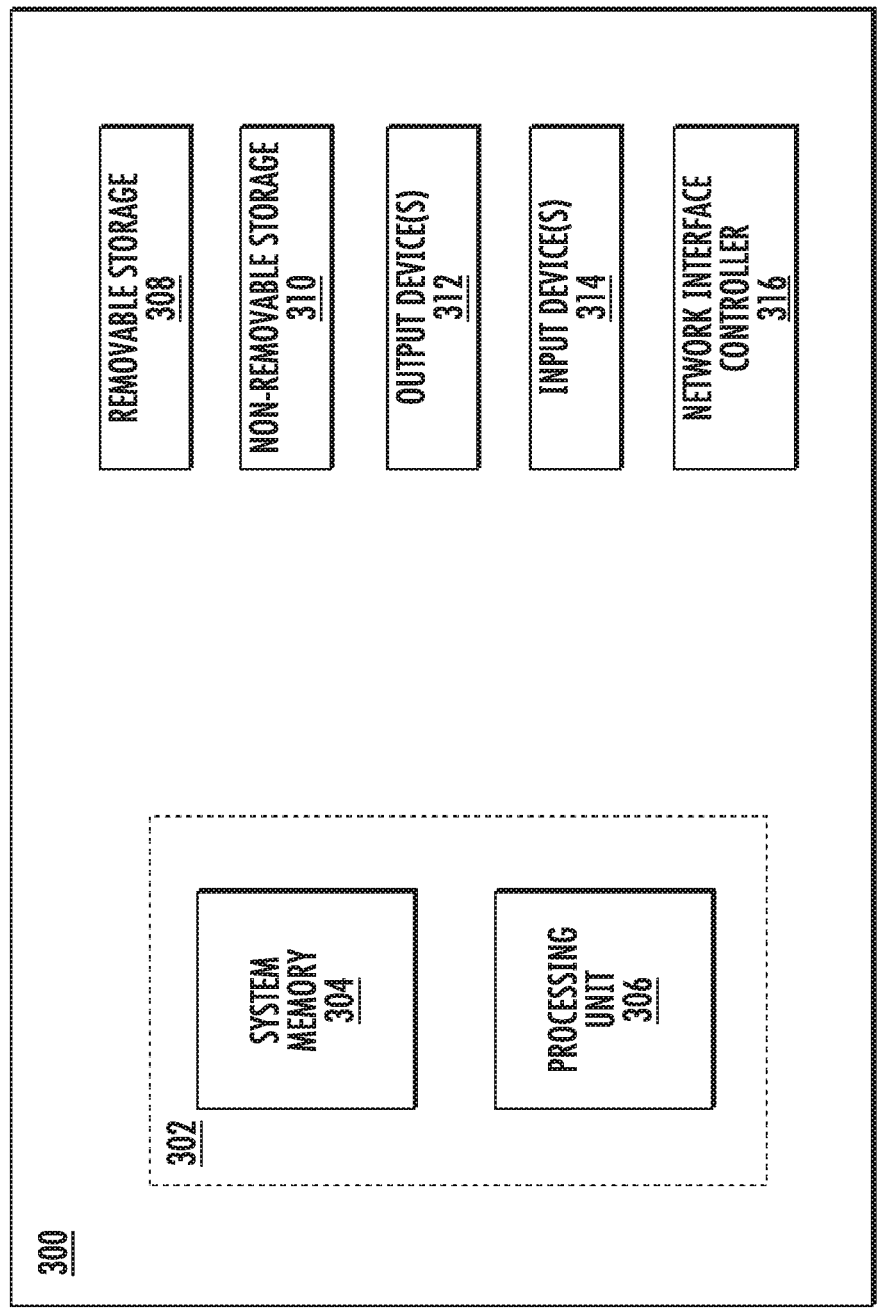
FIG. 4 illustrates an example computing device upon which embodiments of the invention may be implemented.

When the logical operations described herein are implemented in software, the process may execute on any type of computing architecture or platform. Such a computing device 300 as shown in FIG. 4 can be the same as computing device 110, described above, or used alternatively for computing device 110. For example, referring to FIG. 4, an example computing device 300 upon which embodiments of the invention may be implemented is illustrated. The computing device 300 can optionally be a mobile computing device such as a smart device, a laptop computer, a tablet computer, a mobile phone and the like. The computing device 300 may include a bus or other communication mechanism for communicating information among various components of the computing device 300. In its most basic configuration, computing device 300 typically includes at least one processing unit 306 and system memory 304.

Depending on the exact configuration and type of computing device, system memory 304 may be volatile (such as random access memory (RAM)), non-volatile (such as read-only memory (ROM), flash memory, etc.), or some combination of the two. This most basic configuration is illustrated in FIG. 3 by dashed line 302. The processing unit 306 may be a standard programmable processor that performs arithmetic and logic operations necessary for operation of the computing device 300.

Computing device 300 may have additional features/functionality. For example, computing device 300 may include additional storage such as removable storage 308 and non-removable storage 310 including, but not limited to, magnetic or optical disks or tapes. Computing device 300 may also contain network connection(s) 316 that allow the device to communicate with other devices. Computing device 300 may also have input device(s) 314 such as a keyboard, mouse, touch screen, etc. Output device(s) 312 such as a display, speakers, printer, etc. may also be included. The additional devices may be connected to the bus in order to facilitate communication of data among the components of the computing device 300. All these devices are well known in the art and need not be discussed at length here.

The processing unit 306 may be configured to execute program code encoded in tangible, computer-readable media. Computer-readable media refers to any media that is capable of providing data that causes the computing device 300 (i.e., a machine) to operate in a particular fashion. Various computer-readable media may be utilized to provide instructions to the processing unit 306 for execution. Common forms of computer-readable media include, for example, magnetic media, optical media, physical media, memory chips or cartridges, or any other non-transitory medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 306 may execute program code stored in the system memory 304. For example, the bus may carry data to the system memory 304, from which the processing unit 306 receives and executes instructions. The data received by the system memory 304 may optionally be stored on the removable storage 308 or the non-removable storage 310 before or after execution by the processing unit 306.

Computing device 300 typically includes a variety of computer-readable media. Computer-readable media can be any available media that can be accessed by device 300 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 304, removable storage 308, and non-removable storage 310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of computing device 300.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

The techniques for making distance measurements using a single image capture device described herein can optionally be implemented with a mobile computing device, such as a smart device, a laptop computer, tablet computer or mobile phone. Accordingly, the mobile computing device is extremely small compared to conventional devices and is very portable, which allows the mobile computing device to be used wherever needed.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 5:
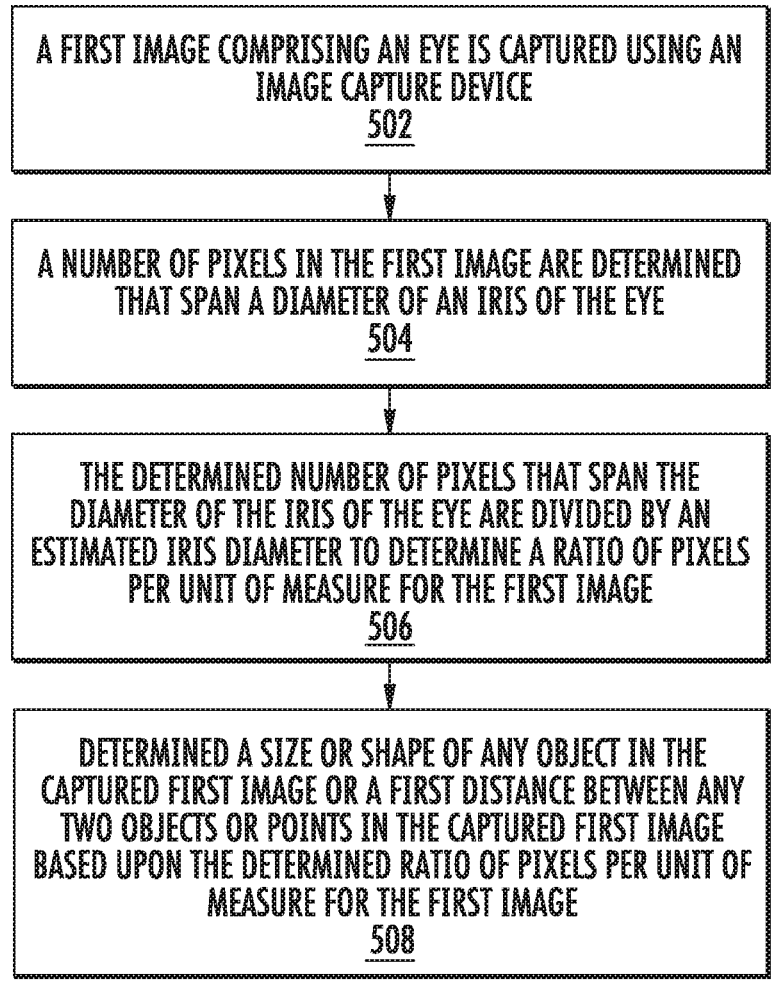
FIG. 5 illustrates an example method for making distance measurements using a single image capture device.

FIG. 5 illustrates an example method for making measurements using a single image capture device. At 502, a first image comprising an eye is captured using an image capture device, wherein the first image of the eye comprises an iris of the eye. At 504, a number of pixels in the first image are determined that span a diameter of the iris of the eye. At 506, the determined number of pixels that span the diameter of the iris of the eye are divided by an estimated iris diameter to determine a ratio of pixels per unit of measure for the first image. At 508, based upon the determined ratio of pixels per unit of measure for the first image, a size or shape of any object in the captured first image or a first distance between any two objects or points in the captured first image is determined.

Though not shown in FIG. 5, in various aspects the method may also include recording a first time value when the first image is captured; capturing a second image using the image capture device that includes the any two objects or points in the captured first image that were used to determine the first distance and recording a second time value when the second image is captured; determining, based upon the determined ratio of pixels per unit of measure for the first image, a second distance between the any two objects or points in the captured second image; and determining a speed of movement of at least one of the any two objects or points by dividing a change in the first distance and the second distance by a change in the first time value and the second time value.

In yet another aspect, the method may comprise further recording a first time value when the first image is captured; capturing, using the image capture device, a second image comprising the eye, wherein the second image of the eye comprises the iris of the eye and the any two objects or points in the captured first image; determining a number of pixels in the second image that span a diameter of the iris of the eye; dividing the determined number of pixels that span the diameter of the iris of the eye in the second image by the estimated iris diameter to determine a ratio of pixels per unit of measure for the second image; determining, by the computing device, based upon the determined ratio of pixels per unit of measure for the second image, a second distance between the any two objects or points in the captured first image; and determining, by the computing device, a speed of movement of at least one of the any two objects or points by dividing a change in the first distance and the second distance by a change in the first time value and the second time value.

In yet another aspect, embodiments of the method may comprise providing a table that correlates the determined ratio of pixels per unit of measure for the image capture device to a distance the image capture device is from an object in an image captured by the image capture device and using the determined ratio of pixels per unit of measure in the first image to determine a first distance that the image capture device was from an object in the first image using the table that correlates the determined ratio of pixels per unit of measure for the image capture device to the distance the image capture device is from the object in the image captured by the image capture device. Or, in another aspect, the method may comprise using the determined ratio of pixels per unit of measure in the second image to determine a second distance that the image capture device was from an object in the second image using the table that correlates the determined ratio of pixels per unit of measure for the image capture device to the distance the image capture device is from the object in the image captured by the image capture device.

Figure 6:
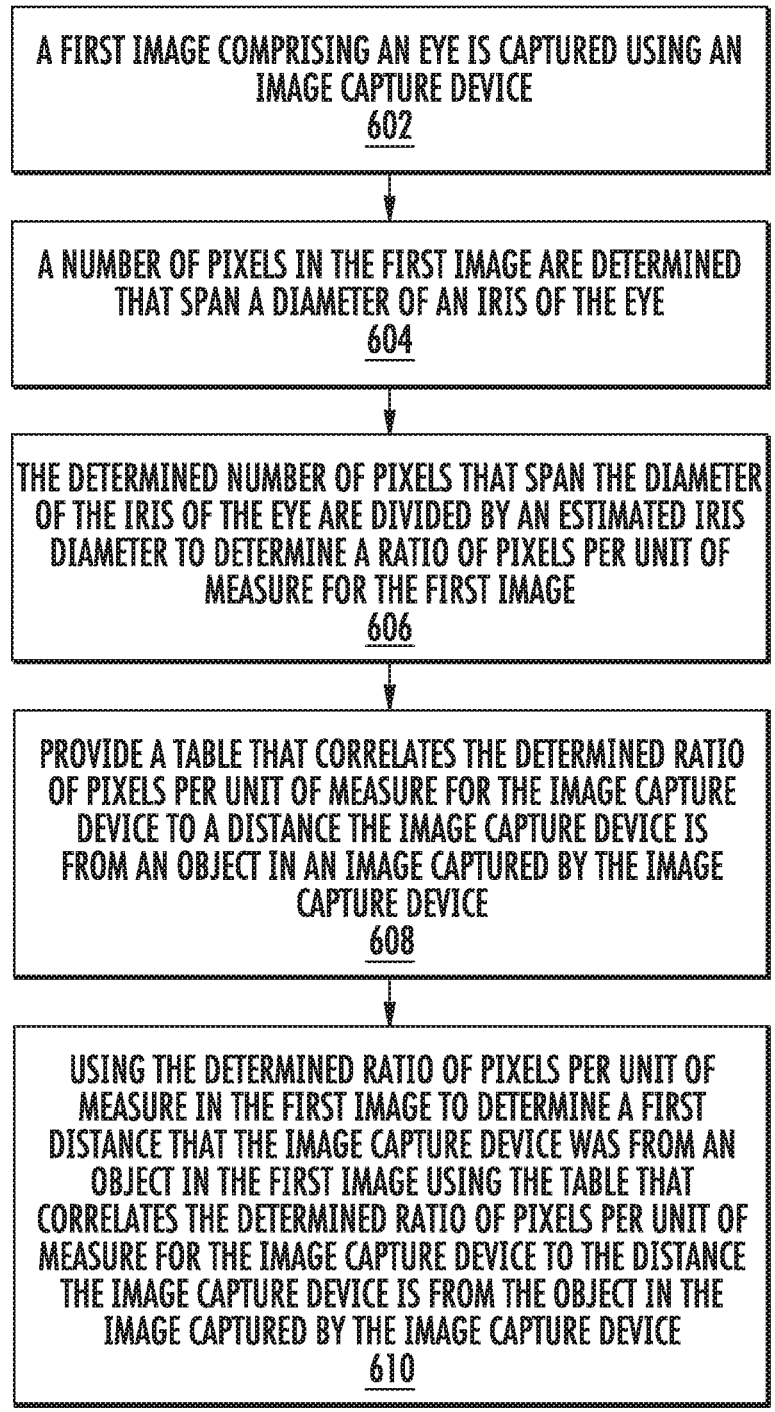
FIG. 6 illustrates another example method for making distance measurements using a single image capture device.

FIG. 6 illustrates another example method for making measurements using a single image capture device. At 602, a first image is captured using an image capture device, wherein the first image of the eye comprises an iris of the eye. At 604, a number of pixels in the first image that span a diameter of the iris of the eye are determined. At 606, the determined number of pixels that span the diameter of the iris of the eye is divided by an estimated iris diameter to determine a ratio of pixels per unit of measure for the first image. At 608, a table that correlates the determined ratio of pixels per unit of measure for the image capture device to a distance the image capture device is from an object in an image captured by the image capture device is provided. And, at 610, using the determined ratio of pixels per unit of measure in the first image to determine a first distance that the image capture device was from an object in the first image using the table that correlates the determined ratio of pixels per unit of measure for the image capture device to the distance the image capture device is from the object in the image captured by the image capture device.

While many of the uses of the embodiments disclosed herein have been described, other non-limiting examples of use can include eye tracking techniques to determine where a person is looking at when viewing advertising, how the eyes move while reading text, etc. Also, imaging in security systems also need to know the distance of the person from the camera in some applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   capturing, using an image capture device, a first image comprising an eye, wherein the first image of the eye comprises an iris of the eye and recording a first time value when the first image is captured;
   determining, by a computing device, a number of pixels in the first image that span a diameter of the iris of the eye;
   dividing the determined number of pixels that span the diameter of the iris of the eye by an estimated iris diameter to determine a ratio of pixels per unit of measure for the first image;
   determining, by the computing device, based upon the determined ratio of pixels per unit of measure for the first image, a size or shape of any object in the captured first image or a first distance between any two objects or points in the captured first image;
   capturing a second image using the image capture device that includes the any two objects or points in the captured first image that were used to determine the first distance and recording a second time value when the second image is captured;
   determining, by the computing device, based upon the determined ratio of pixels per unit of measure for the first image, a second distance between the any two objects or points in the captured second image; and
   determining, by the computing device, a speed of movement of at least one of the any two objects or points by dividing a change in the first distance and the second distance by a change in the first time value and the second time value.

2. The method of claim 1, wherein the estimated iris diameter comprises an average iris diameter of a human.

3. The method of claim 1, wherein the estimated iris diameter comprises an average iris diameter of a human based upon an age of the human.

4. The method of claim 1, wherein the estimated iris diameter comprises an average iris diameter of an adult human.

5. The method of claim 4, wherein the average iris diameter of an adult human is 11.5 mm.

6. The method of claim 1, further comprising:
   recording a first time value when the first image is captured;
   capturing, using the image capture device, a second image comprising the eye, wherein the second image of the eye comprises the iris of the eye and the any two objects or points in the captured first image;
   determining, by the computing device, a number of pixels in the second image that span a diameter of the iris of the eye;
   dividing the determined number of pixels that span the diameter of the iris of the eye in the second image by the estimated iris diameter to determine a ratio of pixels per unit of measure for the second image;
   determining, by the computing device, based upon the determined ratio of pixels per unit of measure for the second image, a second distance between the any two objects or points in the captured first image; and
   determining, by the computing device, a speed of movement of at least one of the any two objects or points by dividing a change in the first distance and the second distance by a change in the first time value and the second time value.

7. The method of claim 1, further comprising providing a table that correlates the determined ratio of pixels per unit of measure for the image capture device to a distance the image capture device is from an object in an image captured by the image capture device.

8. The method of claim 7, further comprising using the determined ratio of pixels per unit of measure in the first image to determine a first distance that the image capture device was from an object in the first image using the table that correlates the determined ratio of pixels per unit of measure for the image capture device to the distance the image capture device is from the object in the image captured by the image capture device.

9. The method of claim 8, wherein the object in the first image is the eye.

10. The method of claim 1, further comprising providing a table that correlates the determined ratio of pixels per unit of measure for the image capture device to a distance the image capture device is from an object in an image captured by the image capture device.

11. The method of claim 10, further comprising using the determined ratio of pixels per unit of measure in the second image to determine a second distance that the image capture device was from an object in the second image using the table that correlates the determined ratio of pixels per unit of measure for the image capture device to the distance the image capture device is from the object in the image captured by the image capture device.

12. The method of claim 11, wherein the object in the second image is the eye.

13. The method of claim 1, wherein the image capture device comprises a smart device, a smart phone or other mobile computing device having a camera.

14. The method of claim 13, wherein the computing device comprises a processor in the smart device, smart phone or other mobile computing device having a camera.

15. The method of claim 13, wherein the computing device comprises a processor separate from the smart device, smart phone or other mobile computing device having a camera.

16. The method of claim 1, wherein the image capture device captures a still image or a video of the eye.

17. An apparatus comprised of:
  an image capture device;
  a memory; and
  a processor in communication with the memory and the image capture device, wherein the processor executes computer-readable instructions stored in the memory that cause the processor to;
    capture, using the image capture device, a first image comprising an eye, wherein the first image of the eye comprises an iris of the eye and recording a first time value when the first image is captured;
    determine a number of pixels in the first image that span a diameter of the iris of the eye;
    divide the determined number of pixels that span the diameter of the iris of the eye by an estimated iris diameter to determine a ratio of pixels per unit of measure for the first image;
    determine, based upon the determined ratio of pixels per unit of measure for the first image, a size or shape of any object in the captured first image or a first distance between any two objects or points in the captured first image;
    capture a second image using the image capture device that includes the any two objects or points in the captured first image that were used to determine the first distance and recording a second time value when the second image is captured;
    determine, based upon the determined ratio of pixels per unit of measure for the first image, a second distance between the any two objects or points in the captured second image; and
    determine a speed of movement of at least one of the any two objects or points by dividing a change in the first distance and the second distance by a change in the first time value and the second time value.

18. The apparatus of claim 17, wherein the processor executing computer-readable instructions stored in the memory further cause the processor to:
  record a first time value when the first image is captured;
  capture, using the image capture device, a second image comprising the eye, wherein the second image of the eye comprises the iris of the eye and the any two objects or points in the captured first image;
  determine a number of pixels in the second image that span a diameter of the iris of the eye;
  divide the determined number of pixels that span the diameter of the iris of the eye in the second image by the estimated iris diameter to determine a ratio of pixels per unit of measure for the second image;
  determine, based upon the determined ratio of pixels per unit of measure for the second image, a second distance between the any two objects or points in the captured first image; and
  determine a speed of movement of at least one of the any two objects or points by dividing a change in the first distance and the second distance by a change in the first time value and the second time value.

* * * * *